United States Patent
Waldner

(10) Patent No.: US 10,544,959 B2
(45) Date of Patent: Jan. 28, 2020

(54) POTATO STORAGE VENT

(71) Applicant: John Waldner, MacGregor (CA)

(72) Inventor: John Waldner, MacGregor (CA)

( * ) Notice: Subject to any disclaimer, the term of this patent is extended or adjusted under 35 U.S.C. 154(b) by 0 days.

(21) Appl. No.: 15/530,624

(22) Filed: Feb. 10, 2017

(65) Prior Publication Data

US 2018/0231270 A1 Aug. 16, 2018

(51) Int. Cl.
| | |
|---|---|
| *F24F 13/06* | (2006.01) |
| *E04B 5/48* | (2006.01) |
| *F24F 13/02* | (2006.01) |
| *E04H 5/08* | (2006.01) |

(52) U.S. Cl.
CPC .......... *F24F 13/06* (2013.01); *F24F 13/0227* (2013.01); *E04B 5/48* (2013.01); *E04H 5/08* (2013.01)

(58) Field of Classification Search
CPC ........ A01F 25/08; A01F 25/22; F24F 13/072; F24F 13/06; F24F 13/0227; E04H 5/08; E04B 5/48
See application file for complete search history.

(56) References Cited

U.S. PATENT DOCUMENTS

| | | | | | |
|---|---|---|---|---|---|
| 770,326 | A | * | 9/1904 | Slater ...................... | F24F 13/06 454/290 |
| 3,985,158 | A | * | 10/1976 | Felter ........................ | F16L 9/12 138/149 |
| 5,451,081 | A | * | 9/1995 | Kaucnik ................. | E02D 29/14 285/189 |
| 5,460,572 | A | * | 10/1995 | Waltz .................... | E04B 1/7076 454/271 |
| 5,496,213 | A | * | 3/1996 | Miller .................. | E04B 1/7076 249/39 |
| 5,713,172 | A | * | 2/1998 | Tegland .................. | F24F 13/06 454/174 |
| 6,776,710 | B1 | * | 8/2004 | Messmer ................ | F24F 13/06 34/97 |

FOREIGN PATENT DOCUMENTS

CA 2363858 A1 * 5/2003 ............ F24F 13/072

* cited by examiner

*Primary Examiner* — Jessie T Fonseca
(74) *Attorney, Agent, or Firm* — Robert W.B. Bailey

(57) ABSTRACT

A plug for an air vent which fits into the top aperture of the air vent prevents cement flowing into the vent when a concrete floor is laid. The vent has a peripheral protrusion and a top flange. The plug protrusion snap fits into a concave groove in the top of the vent aperture. The flange extends upward an outward from the vent top so the laid concrete floor has a slot communicating with the vent and the vent top is installed below the floor and thus cannot be easily damaged by storing and removal of produce.

8 Claims, 3 Drawing Sheets

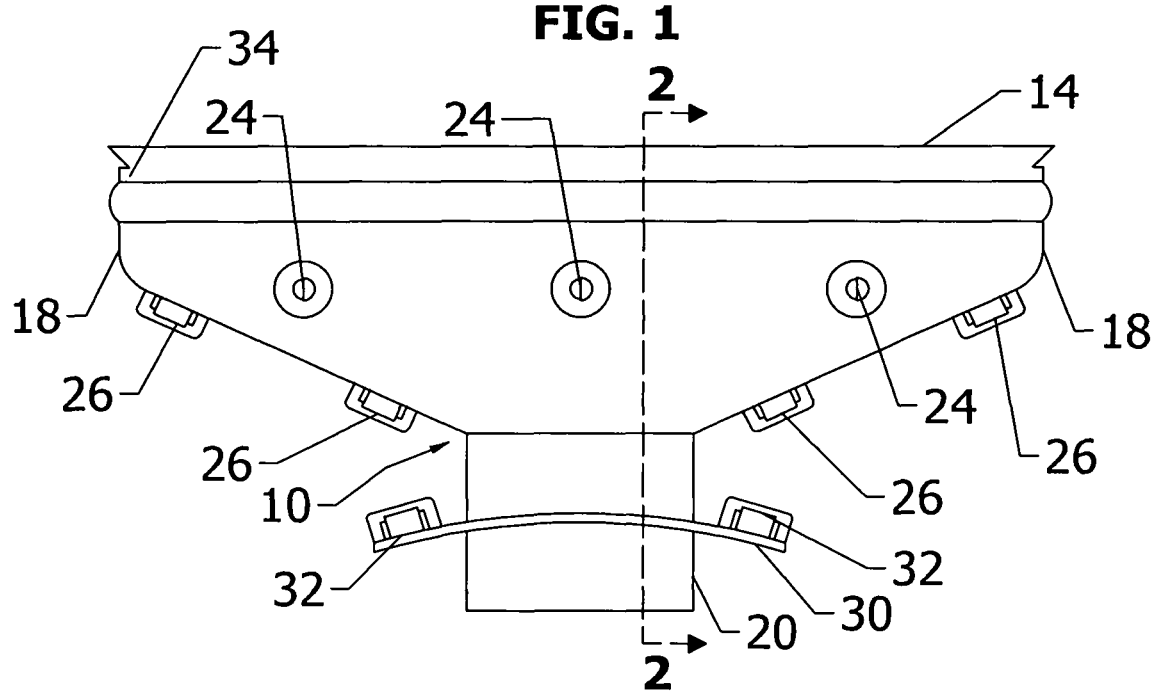
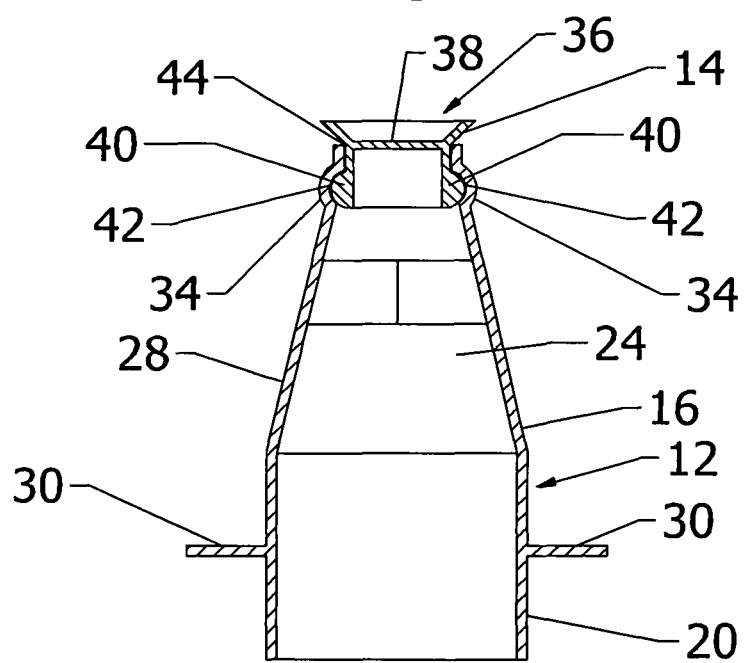

POTATO STORAGE VENT

FIELD OF THE INVENTION

Storage vents are typically used to introduce air from the floor of a storage facility into the stored material, which in this case is potatoes, although the stored material may be similar vegetable material. The vents are essential to ventilate the vegetables during storage. Generally the vent extends through a concrete floor from an underground air supply duct system below the floor into the storage area. More typically the vents are rigid plastic and their tops are level with the floor surface and protrude through the floor surface. Customarily the vents are narrow elongated and twice the area of the circular connection to the air supply system.

This invention is directed to a vent that can be installed entirely below the concrete floor but with an aperture in the concrete extending downward to the vent proper, The invention also has a snap fit plug of flexible rubber like material fitting snugly into the top of the vent, which allows the vent to be embedded so its top is below the floor level of the storage facility, which as explained below reduces wear and tear on the vent to and prevents fragmentation of the vents. The vent itself is modified to receive the plug during installation.

BACKGROUND OF THE INVENTION

Current storage vents generally extend until they are flush with the concrete floor, that is they extend to the surface of the concrete floor. When the potatoes or other vegetables are stored or removed vehicles such as trucks are used to store and remove the vegetables. These vehicles may damage and degrade the tops of the vents at about the surface of the concrete floor. At their top the vents fit a slot in the concrete floor typically about 1 inch (about 2½ cm) by 14¼ inches (about 36 cm). At the bottom there is an circular inlet duct, perpendicular to the slot, about 3 inches (about 7½ cm) diameter, the area of the slot is about twice the area of the inlet duct, which allows for about half the outlet slot to be blocked by stored vegetables while air is blown into the storage area. The vent and attached duct are moulded from plastic, typically around ⅛ or 3/16 inch (about 3 or 4½ mm) thick.

PRIOR ART

Applicant is not aware of any similar prior art. Applicant has manufactured and sold a similar product lacking the snap fit plug, which as installed has a vent top level with the concrete floor. The prior art vent has a horizontal slot as described above about 1 inch (about 2½ cm) by 14¼ inches (about 36 cm), connected at its base to a circular inlet duct, perpendicular to the slot, about 3 inches (about 7½ cm) diameter, the area of the slot is about twice the area of the inlet duct, which allows for about half the outlet slot to be blocked by stored vegetables while air is blown into the storage area. The vent and attached duct are moulded from plastic, typically around ⅛ or 3/16 inch (about 3 or 4½ mm) thick. The longitudinal side walls of the slot, which are generally planar, expand outward and downward, to meet and merge at their base with the circular duct, while the shorter transverse end walls of the slot incline inward to meet and merge at their base with the circular duct. In practice the end walls curve inward as an arc of a circle to meet the duct, however this is not essential, although it is convenient. The end walls and side walls meet to form a curved exterior edge surface, again not essential although convenient.

SUMMARY OF THE INVENTION

The vent of the invention has an internal recess adjacent and circumferential the top of the vent, which forms an external circumferential bulge in the vent wall. Otherwise the vent of the invention is nearly identical to the prior product. The instant vent has a horizontal slot as described above about 1 inch (about 2½ cm) by 14¼ inches (about 36 cm), connected at its base to a circular inlet duct, perpendicular to the slot, about 3 inches (about 7½ cm) diameter, the area of the slot is about twice the area of the inlet duct, which allows for about half the outlet slot to be blocked by stored vegetables while air is blown into the storage area. The vent and attached duct are moulded from rigid plastic, typically around ⅛ or 3/16 inch (about 3 or 4½ mm) thick. Suitable rigid plastics are well known to those skilled in the art and there is a wide variety of such suitable plastics commercially available. The longitudinal side walls of the slot, which are generally planar, expand outward and downward, to meet and merge at their base with the circular duct, while the shorter transverse end walls of the slot incline inward to meet and merge at their base with the circular duct. In practice the end walls curve inward as an arc of a circle to meet the duct, however this is not essential, although it is convenient. The end walls and side walls meet to form a curved exterior edge surface, again not essential although convenient. The improvement comprises having a plug fitting into the top slot of the vent extending upward about ¼ inches (about 6 mm) from the top of the vent, which inclines outward from the slot. When present the plug extends downward into the mouth of the vent. More conveniently the plug has a peripheral convex protrusion or bulge, horizontal during vent installation which engages a similar shaped concave recess in the mouth of the vent, as the plug is made of flexible rubber like material the protrusion snap fits into the recess during installation. Suitable flexible rubber like materials are well known to those skilled in the art and again there is a wide variety of such suitable materials commercially available.

In installation of the vents they are attached to a duct assembly to provide air ventilation, usually forming an array with the tops of the plugs and vents level. Concrete is then poured to from a floor typically about 5 inches (about 13 cm) thick, which extends to the level of the top of the plugs. The concrete is allowed to harden then the plugs are removed, which leaves a slot in the concrete communicating with the vent slot. The vent top is thus below the level of the concrete floor and thus not subject to damage by vehicle tires impacting the vent tops during potato introduction or removal.

DESCRIPTION OF THE INVENTION

In one broad aspect the invention is directed to a plug for a floor vent, the floor vent having a rectangular top aperture to communicate with the storage facility through a concrete floor, and; The plug comprises a body of flexible rubber like material, the body is rectangular having paired opposed parallel longitudinal side walls and paired opposed parallel transverse end walls connecting the longitudinal walls, and a flange extending peripherally from the body This flange extends upward and outward from the body at an angle to the side and end walls, and; the rectangular body of the plug is dimensioned to fit matingly within the aperture of the air vent. Preferably the side walls and end walls comprise a lower peripheral convex protrusion, and this protrusion is adapted to matingly engage an internal concave groove within the aperture of the air vent. More preferably the flange extends upward and outward from the side walls and the end walls. Preferably the lower peripheral convex protrusion extends along the bottom of the side walls and end walls. Preferably a plurality of cross walls connect the side walls at right angles to the side walls parallel to the end walls. Preferably a level connecting member connects the end walls the connecting member comprising threadlike members extending from end wall to end wall. More preferably a plurality of cross walls connect the side walls at right angles to the side walls parallel to the end walls, and the connecting members pass through the cross walls.

In a second broad aspect the invention is directed to a floor vent for a storage facility comprising a rectangular top aperture to communicate with the storage facility through a concrete floor and a bottom circular aperture to communicate with a subfloor air duct system. The vent comprises rigid plastic. The top aperture comprises parallel spaced apart opposed longitudinal side walls connected by parallel spaced apart opposed transverse end walls. The longitudinal and transverse walls extend downward from the rectangular aperture to the bottom aperture, and the rectangular top aperture matingly engages a plug. More preferably the top aperture comprises a lower internal concave groove, and the rectangular top aperture matingly engages a plug, which has a protrusion which matingly engages the internal concave groove. More preferably the rectangular aperture has a circumferential internal concave groove in the longitudinal and transverse walls and; the rectangular top aperture matingly engages a plug which has a protrusion which matingly engages the internal concave groove. Preferably the parallel spaced apart opposed longitudinal side walls of the vent incline outward and downward to merge into the cylindrical wall and, the parallel spaced apart opposed transverse end walls of the vent incline inward and downward to merge into the cylindrical wall and, the longitudinal and transverse walls remained connected until they merge into the cylindrical wall. Typically the cylindrical wall of the vent comprises a mounting flange projecting outward from cylindrical wall.

In a third broad aspect the invention is directed to a method of use of the vent and plug comprising the step of attaching the vent to a subfloor air duct system, and; the step of inserting the plug of into the top aperture of the vent so that it matingly engages the aperture, and; the step of pouring concrete around the vent to the level of the flanges of the plug, and the step of allowing the poured concrete to cure, and; the step of removing the plug from the vent; whereby the vent is installed below the surface of the poured concrete.

BRIEF DESCRIPTION OF THE DRAWINGS

FIG. 1 shows a side view of an embodiment of the invention.

FIG. 2 shows a sectional transverse view of the embodiment of FIG. 1.

DESCRIPTION OF THE PREFERRED EMBODIMENT

Figure 3:
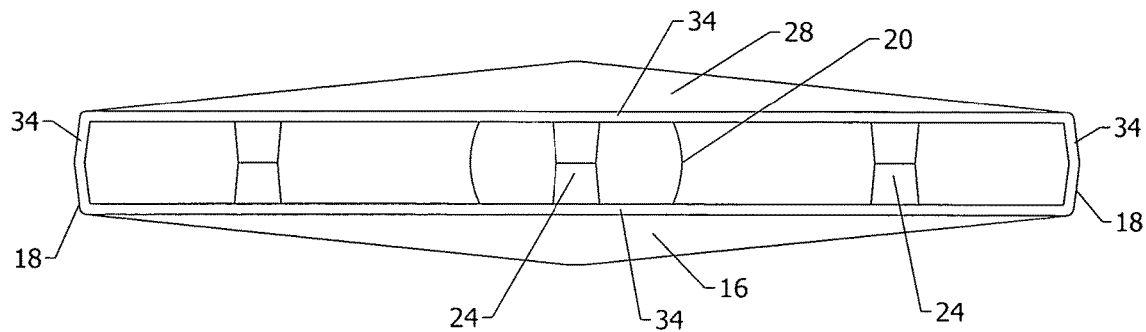
FIG. 3 shows a top view of the inlet of FIG. 1 without its associated plug.

The invention is illustrated by reference to the preferred embodiment. Numeral 10 indicates the floor inlet assembly of the invention, which comprises inlet 12 and plug 14, inlet 12 has front surface 16, end surfaces 18 and cylindrical bottom duct 20. End surfaces 18 incline inward as shown forming an arc of a circle to smoothly merge into cylindrical duct 20 similarly front surface 16 inclines outward to smoothly merge into cylindrical duct 20 as does rear surface 28. Support pillars 24 joining front surface 16 to rear surface 28, prevent the floor inlet collapsing when concrete is pored around it. Support pillars 24 interlock, or friction fit together. Fasteners 26 similarly join front surface 16 to rear surface 28. Mounting flange 30, which is used to attach inlet 10 to a ventilation pipe, not shown is similarly joined by fasteners 32. Inlet 12 has top peripheral protrusion 34 convex externally, concave internally surrounding slot 36, which matingly receives plug 14.

Figure 4:
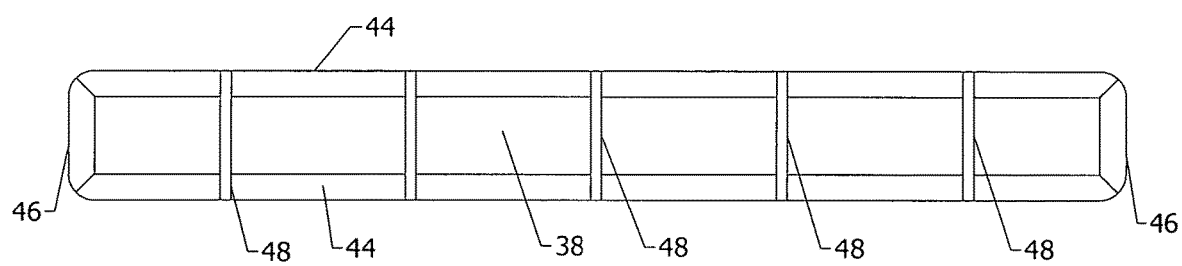
FIG. 4 shows a top view of the plug of the embodiment of FIG. 1
Figure 5:
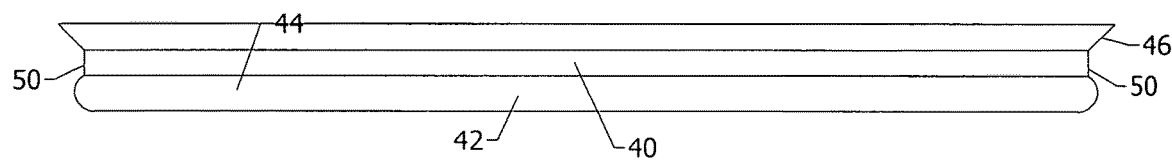
FIG. 5 shows a side view of the plug of the embodiment of FIG. 1.
Figure 6:
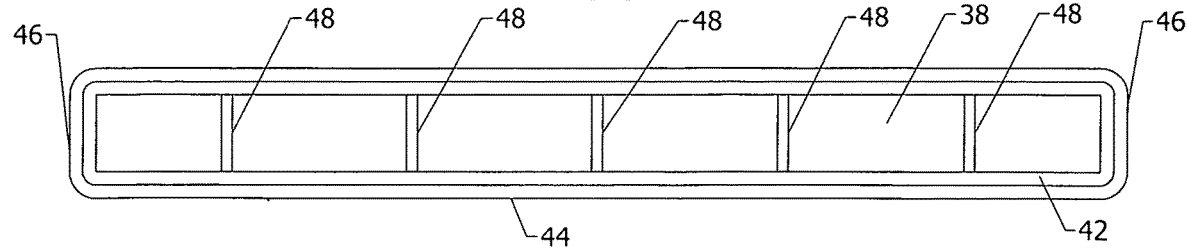
FIG. 6 shows a bottom view of the plug of the embodiment of FIG. 1
Figure 7:
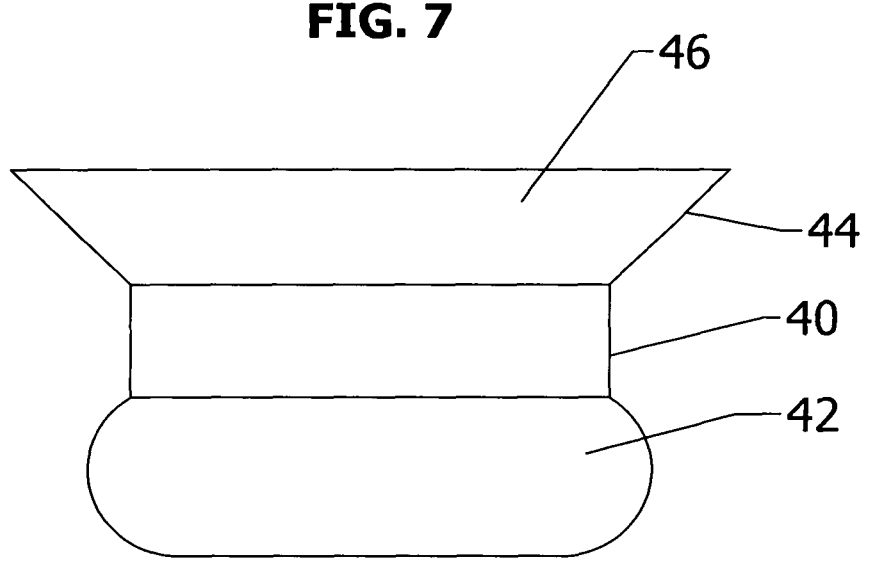
FIG. 7 shows an end view of the plug of the embodiment of FIG. 1.

Plug 14 has side walls 40, which have peripheral convex protrusion 42 which engages the concave interior of protrusion 30. Plug 14 has level connecting wall 38 and outward inclined side flanges 44 and end flanges 46. Outward inclined flanges 44 and 46 extend upward from the top of slot 36 about ¼ inch (6⅜ mm) and outward about the same distance, the angle is about 45°, these flanges are about 1/16 inch (1½ mm) thick. As shown in FIG. 4, several cross walls 48 connect flanges 44 above level connecting wall 38. Cross walls 48 are about 1/16 inch (1½ mm) thick, level connecting wall 38 is composed of parallel threads extending along the length of the plug, typically about 1/16 or 1/32 inch thick (1½ or ¾ mm), in use this allows small stones from the cement to fall down through the inlet opening 36. Plug sidewalls 40 are also about 1/16 inch (1½ mm) thick as are end walls 50. Side walls 40 and end walls 50 extend downward about ⅜ inch (1 cm) the bottom portion of which is protrusion 42, which is convex extending about 5/16 inch (¾ cm) downward and is about 3/16 inch (½ cm) thick at maximum. As shown in FIG. 6 cross walls 48 also connect side walls 40 below cross wall 38, while flanges 44 and 46 project marginally beyond protrusion 34. The number of cross walls 48 is not critical and one or more may be optionally doubled separating plug 14 into two or more sections, however a unitary plug is preferred.

As those skilled in the art realize these preferred, disclosed and described details and materials and components can be subjected to substantial variation, modification, change, alteration and substitution without affecting or modifying the function of the described embodiments. Although specific embodiments of the invention are described above, it is not limited thereto. Numerous modifications and variations fall within the scope of the claimed, disclosed and described invention, as interpreted in the light of natural laws of science and engineering as understood by persons skilled in the art.

I claim:

1. A floor vent for a storage facility comprising a rectangular top aperture to communicate with the storage facility through a concrete floor and a circular bottom aperture to communicate with a subfloor air duct system, and;
    said floor vent comprising rigid plastic, said top aperture comprises parallel spaced apart opposed longitudinal side walls connected by parallel spaced apart opposed transverse end walls, and;

said longitudinal side walls and said transverse end walls extend downward from said rectangular aperture to said circular bottom aperture, and;

a plug comprising a body, said body being rectangular having paired opposed parallel longitudinal plug side walls and paired opposed parallel transverse plug end walls connecting said longitudinal plug side walls, and;

a flange extending peripherally from said body, said flange extending upward from said body at said plug side walls and said plug end walls, and;

said rectangular body of said plug is dimensioned to fit matingly within said rectangular aperture of said floor vent, whereby when said plug and vent are installed by pouring cement to form a concrete floor, said plug is removed to form an aperture in said floor leading downward to said vent, so said vent is embedded with its top below a top surface of said floor.

2. The vent of claim 1, wherein said top rectangular aperture comprises a lower internal concave groove, and;

said longitudinal side walls and said transverse end walls of said plug comprise a lower peripheral convex protrusion and;

said protrusion is adapted to matingly engage said lower internal concave groove of said top aperture.

3. The vent of claim 1, wherein the flange of said plug extends upward and outward from said plug side walls and said plug end walls.

4. The vent of claim 1, wherein a plurality of cross walls connect said plug side walls at right angles to said plug side walls, wherein said plurality of cross walls are parallel to said plug end walls.

5. The vent of claim 1, wherein a level connecting member connects said plug end walls, said connecting member comprising threads extending from one of the plug end walls to the other of the plug end walls.

6. The vent of claim 5, wherein a plurality of cross walls connect said plug side walls at right angles to said plug side walls, wherein said plurality of cross walls are parallel to said plug end walls, and said level connecting member passes through said cross walls.

7. The vent of claim 1, wherein said parallel spaced apart opposed longitudinal side walls of said vent incline outward and downward to merge into a cylindrical wall forming the circular aperture and, wherein said parallel spaced apart opposed transverse end walls of said vent incline inward and downward to merge into said cylindrical wall and, said longitudinal and transverse walls remain connected until they merge into said cylindrical wall.

8. The vent of claim 7, wherein said cylindrical wall comprises a mounting flange projecting outward from said cylindrical wall.

* * * * *